United States Patent
Sicard-Cras

(10) Patent No.: US 10,929,281 B1
(45) Date of Patent: Feb. 23, 2021

(54) SYSTEMS AND METHODS FOR TESTING OF DATA TRANSFORMATIONS

(71) Applicant: JPMorgan Chase Bank, N.A., New York, NY (US)

(72) Inventor: Maël Sicard-Cras, Glasgow (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 24 days.

(21) Appl. No.: 15/600,009

(22) Filed: May 19, 2017

Related U.S. Application Data

(60) Provisional application No. 62/339,206, filed on May 20, 2016.

(51) Int. Cl.
*G06F 9/44* (2018.01)
*G06F 9/455* (2018.01)
(Continued)

(52) U.S. Cl.
CPC ............ *G06F 11/3692* (2013.01); *G06F 8/73* (2013.01); *G06F 11/3684* (2013.01); *G06F 16/2365* (2019.01); *G06F 16/254* (2019.01)

(58) Field of Classification Search
CPC .... G06F 11/3692; G06F 8/73; G06F 11/3684; G06F 17/30371; G06F 17/30563; G06F 16/254; G06F 16/2365
See application file for complete search history.

(56) References Cited

U.S. PATENT DOCUMENTS 9,002,770 B2 * 4/2015 Gould .................. G06F 8/10
706/47
9,111,030 B1 * 8/2015 Dunn ...................... G06F 11/36
(Continued)

FOREIGN PATENT DOCUMENTS

CN 102915303 B * 4/2016

OTHER PUBLICATIONS

Nan Li, A Scalable Big Data Test Framework, 2015, pp. 1-2. https://ieeexplore.ieee.org/stamp/stamp.jsp?arnumber=7102619 (Year: 2015).*

(Continued)

*Primary Examiner* — Mongbao Nguyen
(74) *Attorney, Agent, or Firm* — Hunton Andrews Kurth LLP

(57) ABSTRACT

The invention relates to a computer-implemented system and method for data transformation testing in an extract-transform-load (ETL) system. The method may be conducted on a specially programmed computer system comprising one or more computer processors, electronic storage devices, and networks. The method may comprise the steps of: retrieving input data from a data source; using the input data as input to an actual data transformation to generate actual transformed data, wherein the actual data transformation is executed by the ETL system; using the input data as input to a test module to generate expected transformed data, wherein the input data is dynamically retrieved from the data source and the test module is part of the ETL system; automatically generating documentation for the test module based on comments within the test module; automatically comparing the actual transformed data to the expected transformed data; and generating a report based on the comparison. The method may also comprise monitoring and tracking a number of scenarios automatically, according to a predefined, desired schedule. The invention also relates to computer-implemented system for data transformation testing in an extract-transform-load (ETL) system.

14 Claims, 15 Drawing Sheets

ETL Testing Framework

(51) Int. Cl.
  *G06F 11/36* (2006.01)
  *G06F 8/73* (2018.01)
  *G06F 16/25* (2019.01)
  *G06F 16/23* (2019.01)

(56) References Cited

U.S. PATENT DOCUMENTS

| | | | | |
|---|---|---|---|---|
| 9,280,442 | B1* | 3/2016 | Nicolo | G06F 11/3604 |
| 9,626,416 | B2* | 4/2017 | Li | G06F 17/30563 |
| 9,652,203 | B1* | 5/2017 | Haq | G06F 3/04842 |
| 2008/0270997 | A1* | 10/2008 | Murray | G06F 11/3672 717/131 |
| 2009/0024551 | A1* | 1/2009 | Agrawal | G06N 5/02 706/47 |
| 2011/0173591 | A1* | 7/2011 | Prasad | G06F 8/30 717/126 |
| 2012/0102458 | A1* | 4/2012 | Meijer | G06F 8/73 717/123 |
| 2012/0203166 | A1* | 8/2012 | Riback | A61B 5/14532 604/66 |
| 2012/0330631 | A1* | 12/2012 | Emigholz | G05B 13/048 703/2 |
| 2013/0024478 | A1* | 1/2013 | Spengler | G06F 11/3692 707/795 |
| 2014/0180949 | A1* | 6/2014 | Ramasamy | G06Q 10/1057 705/322 |
| 2015/0020049 | A1* | 1/2015 | Caufield | G06F 11/3684 717/124 |
| 2015/0154097 | A1* | 6/2015 | Duda | G06F 11/3688 714/38.1 |
| 2015/0254171 | A1* | 9/2015 | Harden | G06F 11/3684 717/124 |
| 2015/0261824 | A1* | 9/2015 | Jha | G06F 17/30371 707/690 |
| 2015/0278393 | A1* | 10/2015 | Das | G06Q 10/06395 707/601 |
| 2015/0347261 | A1* | 12/2015 | Li | G06F 11/3409 707/602 |
| 2016/0034379 | A1* | 2/2016 | Shah | G06F 11/3664 707/602 |
| 2016/0140032 | A1* | 5/2016 | Bender | G06F 11/3692 717/126 |
| 2016/0246838 | A1* | 8/2016 | Li | G06F 11/3672 |
| 2016/0292242 | A1* | 10/2016 | Das | G06F 11/3668 |
| 2016/0364325 | A1* | 12/2016 | Ouzzani | G06F 17/30303 |
| 2017/0060968 | A1* | 3/2017 | Dhayapule | G06F 11/368 |
| 2017/0060969 | A1* | 3/2017 | Dhayapule | G06F 16/254 |
| 2017/0109418 | A1* | 4/2017 | Bartlett | G06F 17/30563 |
| 2017/0132300 | A1* | 5/2017 | Sekar | G06Q 10/067 |
| 2017/0154019 | A1* | 6/2017 | Filipsk | G06F 17/227 |

OTHER PUBLICATIONS

Dawit G. Tesfagiorgish, Big Data Transformation Testing based on Data Reverse Engineering, 2015, pp. 1-4. https://ieeexplore.ieee.org/stamp/stamp.jsp?tp=&arnumber=7518308 (Year: 2015).*

Lu Deng, ETC-based methodology on data processing validation, 2009, pp. 1-4. https://ieeexplore.ieee.org/stamp/stamp.jsp?tp=&arnumber=5331822 (Year: 2009).*

Ca, Fully Automated ETL Testing: A Step-by-Step Guide, 2016, pp. 1-11. https://www.ca.com/content/dam/ca/us/files/white-paper/fully-automated-etl-testing-a-step-by-step-guide.pdf (Year: 2016).*

Madhu Dande, The Data Migration Testing Approach, 2015, pp. 64-72. https://www.academia.edu/29593498/The_Data_Migration_Testing_Approach (Year: 2015).*

Boyang Li, Automatically Documenting Unit Test cases, Apr. 2016, pp. 341-350. https://ieeexplore.ieee.org/document/7515485 (Year: 2016).*

Boyang Li, Automatically Documenting Unit Test Case, Apr. 2016, pp. 341-352. https://ieeexplore.ieee.org/document/7515485 (Year: 2016).*

Microgen Financial Systems Microgen 5Series, Web page <https://www.microgenfs.com/wealth-management/microgen-5series/>, 7 Pages, Mar. 23, 2016, retrieved from the Internet Archive WayBack Machine <https://web.archive.org/web/20160323114745/https://www.microgenfs.com/wealth-management/microgen-5series/> on May 31, 2018.

Sybase entry on Wikipedia, Web Page <https://en.wikipedia.org/wiki/Sybase>, 6 pages, Mar. 16, 2016, retrieved from the Internet Archive WayBack Machine <https://web.archive.org/web/20160316065033/https://en.wikipedia.org/wiki/Sybase> on May 31, 2018.

Natural Docs, Web Page <http://naturaldocs.org/>, 3 pages, Apr. 30, 2016, retrieved from the Internet Archive WayBack Machine <https://web.archive.org/web/20160430124446/http://naturaldocs.org/> on May 31, 2018.

Informatica, "Data Integration," Web Page <https://www.informatica.com/products/data-integration.html>, 12 pages, Apr. 1, 2016, retrieved from the Internet Archive WayBack Machine <https://web.archive.org/web/20160401044424/https://www.informatica.com/products/data-integration.html> on May 31, 2018.

Informatica entry on ETLTools.net, Web Page <https://www.etltools.net/informatica.html>, 3 pages, Apr. 2, 2016, retrieved from the Internet Archive WayBack Machine <https://web.archive.org/web/20160402180142/https://www.etltools.net/informatica.html> on May 31, 2018.

Informatica, "Data Warehousing," Web Page <https://www.informatica.com/solutions/next-gen-analytics/data-warehousing.html#fbid=IMgdCs78HOX>, 4 pages, Apr. 3, 2016, retrieved from the Internet Archive WayBack Machine <https://web.archive.org/web/20160403232008/https://www.informatica.com/solutions/next-gen-analytics/data-warehousing.html#fbid=IMgdCs78HOX> on May 31, 2018.

Informatica, "What is Extract Transform Load (ETL)?" Web Page <https://www.informatica.com/services-and-training/glossary-of-terms/extract-transform-load-definition.html>, 2 pages, Apr. 27, 2016, retrieved from the Internet Archive WayBack Machine <https://web.archive.org/web/20160427081453/https://www.informatica.com/services-and-training/glossary-of-terms/extract-transform-load-definition.html> on May 31, 2018.

Fitnesse, Web Page <http://docs.fitnesse.org/>, 2 pages, Apr. 23, 2013, retrieved from the Internet Archive WayBack Machine <https://web.archive.org/web/20130423100246/http://docs.fitnesse.org/> on May 31, 2018.

Fitnesse, "FitNesse FullReferenceGuide UserGuide AcceptanceTests," Web Page <http://fitnesse.org:80/FitNesse.FullReferenceGuide.UserGuide.AcceptanceTests>, 3 pages, Jun. 22, 2015, retrieved from the Internet Archive WayBack Machine <https://web.archive.org/web/20150622082830/http://fitnesse.org:80/FitNesse.FullReferenceGuide.UserGuide.AcceptanceTests> on May 31, 2018.

Fitnesse, "FitNesse. UserGuide.TwoMinuteExample" Web Page <http://fitnesse.org/FitNesse.UserGuide.TwoMinuteExample>, 5 pages, Apr. 25, 2016, retrieved from the Internet Archive WayBack Machine <https://web.archive.org/web/20160517005512/http://fitnesse.org/FitNesse.UserGuide.TwoMinuteExample> on May 31, 2018.

Natural Docs, Web Page <http://naturaldocs.org/>, 3 pages, Apr. 25, 2016, retrieved from the Internet Archive WayBack Machine <https://web.archive.org/web/20160430124446/http://naturaldocs.org/> on May 31, 2018.

Natural Docs Features, Web Page <http://www.naturaldocs.org/features.html>, 3 pages, Apr. 25, 2016, retrieved from the Internet Archive WayBack Machine <https://web.archive.org/web/20160510034530/http://www.naturaldocs.org/features.html> on May 31, 2018.

* cited by examiner

```
IF OBJECT_ID('dbo.test_ipb_stock_profile_t', 'V') IS NOT NULL
|       DROP VIEW dbo.test_ipb_stock_profile_t
GO
/*
|       view: IPB Stock Profile
|
|       Technical documentation for transform m_ipb_stock_profile_t
*/
CREATE VIEW test_ipb_stock_profile_t AS WITH
|       d AS(
|       |       SELECT
|       |       |       /*      *****************************
|       |       |       |       class: data
|       |       |       |       stg_ipb_security (sis)
|       |       |       */
|       |       |       |       /* variable: id_run */
|       |       |       |       sis.id_run,
|       |       |       |       /* variable: cd_ifsapp_env */
|       |       |       |       sis.cd_ifsapp_env,
|       |       |       |       /* variable: cd_custody_env */
|       |       |       |       sis.cd_custody_env,
|       |       |       |       /* variable: cd_isin */
|       |       |       |       sis.cd_isin,
|       |       |       |       /* variable: cd_sedol */
|       |       |       |       sis.cd_sedol,
|       |       |       |       /* variable: cd_cusip */
|       |       |       |       sis.cd_cusip,
|       |       |       |       /* variable: id_security */
|       |       |       |       sis.id_security,
|       |       |       |       /* variable: id_suffix */
|       |       |       |       sis.id_suffix,
|       |       |       |       /* variable: cd_iso_ccy_position */
|       |       |       |       sis.cd_iso_ccy_position,
|       |       |       |       /* variable: nm_short_country */
|       |       |       |       sis.nm_short_country,
|       |       |       |       /* variable: tx_desc_short */
|       |       |       |       sis.tx_desc_short,
|       |       |       |       /* variable: tx_desc_long_1 */
|       |       |       |       sis.tx_desc_long_1,
|       |       |       |       /* variable: tx_desc_long_2 */
|       |       |       |       sis.tx_desc_long_2,
|       |       |       |       /* variable: id_typ_security */
|       |       |       |       sis. id_typ_security,
|       |       |       |       /* variable: id_stock_exchange */
|       |       |       |       sis. id_ stock_exchange,
|       |       |       |       /* variable: dt_issue */
|       |       |       |       sis.dt_issue,
|       |       |       |       /* variable: dt_expy */
|       |       |       |       sis.dt_expy,
|       |       |       |       /* variable: cd_status */
|       |       |       |       sis.cd_status,
|       |       |       |       / variable: id_secclass_level_2 */
|       |       |       |       sis.id_secclass_level_2,
```

| | IPB Stock Tran Dividends |
|---|---|
| IPB Cash Rec | |
| IPB Cash Tran | Technical documentation for transform stock_transaction_dividends_t |
| IPB Contract Tran | Summary |
| IPB Contract Tran Forex Deliv | IPB Stock Tran Dividends Technical documentation for transform stock_transaction_dividends_t |
| IPB Contract Tran Forex Non Deliv | data stg_ipb_mvt_security (sims) |
| IPB Contract Tran Forex Purchase | VARIABLES sims_cd_iso_ccy_cli |
| IPB Exchange Rates | cd_iso_ccy_sett |
| IPB Stock Profile | am_price |
| IPB Stock Tran Cash Diff | am_gross_ccy_pos |
| IPB Stock Tran Cash No Gross Amt Diff | am_gross_ccy_sett |
| IPB Stock Tran Cash No Gross Amt Same | am_net_ccy_pos |
| IPB Stock Tran Cash Same Ccy | am_net_ccy_sett |
| IPB Stock Tran Dividends | am_net_ccy_cli |
| IPB Stock Tran Incomes | am_accrued_interest |
| IPB Stock Tran No Cash | am_brokerage_jpm |
| | am_fees_jpm |
| INDEX | am_brokerage_corr |
| Everything | am_fees_corr |
| Database Views | am_federal_stamp |
| Classes | am_cantonal_tax |
| Variables | am_cap_rlzd_ccy_cli |
| | am_fx_rlzd_ccy_cli |
| Search | am_quantity |
| | am_value_ccy_pos |
| | am_tax_remn |
| | data ifs_subscriber_detail (sub) |
| | VARIABLES |
| | cd_ifsapp_env |
| | cd_custody_env |
| | id_entity_mgen |
| | id_acc_mgen |
| | id_subscriber |
| | cd_acc |
| | data stg_ipb_security (sis) |
| | VARIABLES |
| | id_stock_exchange |
| | cd_quotation |
| | am_quantity_decimals |
| | tx_desc_short |
| | data stg_ipb_mvt_cash (simc) |
| | VARIABLES |
| | cd_iso_ccy_acc |
| | simc_cd_iso_ccy_cli |
| | id_type_acc |

```
/* ********************************
 * class: data
 * main test cases
 */

/*
|_____
    variable: isin
    12 characters, LPAD with zeroes if <cd_isin> less
*/
CASE WHEN LEN(sis.cd_isin) < 12 THEN left(cast(sis.cd_isin as varchar(12))+replicate('0',12),12)ELSE sis.cd_isin END as isin,
CASE WHEN LEN(sis.cd_isin) < 12 THEN '1' ELSE '2' END as isin_Scenario,
/*
|_____
    variable: sedol
    7 characters, LPAD with zeroes if <cd_sedol> less
*/
CASE WHEN LEN(sis.cd_sedol) < 7 THEN left(cast(sis.cd_sedol as varchar(7))+replicate('0',7),7) ELSE sis.cd_sedol END as sedol,
CASE WHEN LEN(sis.cd_sedol) < 7 THEN '1' ELSE '2' END as sedol_Scenario,
/*
|_____
    variable: cusip
    9 characters, LPAD with zeroes if <cd_cusip> less
*/
CASE WHEN LEN(sis.cd_cusip) < 9 THEN left(cast(sis.cd_cusip as varchar(9))+replicate('0',9),9) ELSE sis.cd_cusip END as cusip,
CASE WHEN LEN(sis.cd_cusip) < 9 THEN '1' ELSE '2' END as cusip_Scenario,
/*
|_____
    variable: country
    'XX' if <nm_short_country> empty
*/
CASE WHEN sis.nm_short_country IS NULL OR RTRIM(LTRIM(sis.nm_short_country))='' THEN 'XX' ELSE sis.nm_short_country END as country,
CASE WHEN sis.nm_short_country IS NULL OR RTRIM(LTRIM(sis.nm_short_country))='' THEN '1' ELSE '2' END as country_Scenario,
```

FIG. 5A

| data | |
|---|---|
| VARIABLES | main test cases |
| isin | 12 characters, LPAD with zeroes if cd_isin less |
| sedol | 7 chacters, LPAD with zeroes if cd_sedol less |
| cusip | 9 characters, LPAD with zeroes if cd_cusip less |
| country | 'XX' if nm_short_country empty |
| issueDate | '01/01/1950' is dt_issue empty |
| closeDate | dt_expy if deleted, else NULL |
| optionExpiryDate | If dt_expy is null or (dt_expy < today and cd_status ='A') then '01/01/2050' |
| status | |

FIG. 5B

```
SELECT
    data.id_run as runId,
    data.cd_ifsapp_env as appEnv,
    'IPB' as custodyFeed,
    data.cd_custody_env as custodyEnv,
    'w_ipb_stock_profile_t' as workflowName,
    'm_ipb_stock_profile_t' as mappingName,
    CAST(0 as bit) as reversal,
    '15_' +
    'Isin-' + data.isin_Scenario + '_' +
    'Sedol-' + data.sedol_Scenario + '_' +
    'Cusip-' + data.cusip_Scenario + '_' +
    'Country-' + data.country_Scenario + '_' +
    'IssueDate-' + data.issueDate_Scenario + '_' +
    'CloseDate-' + data.closeDate_Scenario + '_' +
    'OptionExpiryDate-' + data.optionExpiryDate_Scenario + '_' +
    'Status-' + data.status_Scenario
    as scenario,
    CAST(data.id_security as varchar(50)) + '-' + CAST(data.id_suffix as varchar(50)) as id,
```

FIG. 6

```
SELECT
    data.id_run as runId,
    data.cd_ifsapp_env as appEnv,
    'IPB' as custodyFeed,
    data.cd_custody_env as custodyEnv,
    'w_ipb_stock_profile_t' as workflowName,
    'm_ipb_stock_profile_t' as mappingName,
    CAST(0 as bit) as reversal,
    '15_' +
    'Isin-' + data.isin_Scenario + '_' +
    'Sedol-' + data.sedol_Scenario + '_' +
    'Cusip-' + data.cusip_Scenario + '_' +
    'Country-' + data.country_Scenario + '_' +
    'IssueDate-' + data.issueDate_Scenario + '_' +
    'CloseDate-' + data.closeDate_Scenario + '_' +
    'OptionExpiryDate-' + data.optionExpiryDate_Scenario + '_' +
    'Status-' + data.status_Scenario
    as scenario,
    CAST(data.id_security as varchar(50)) + '_' _ CAST(data.id_suffix as varchar(50)) as id, /*
    |   class: Stock Profile
    */

/*
        |       variable: StockProfileIdType,
        |       NULL
        */
        NULL as StockProfileIdType,
        /*
        |       variable: StockProfileId
        |       <data.tx_desc_short>
        */
        data.tx_desc_short as StockProfileId,
        /*
        |       variable: ShortName
        |       NULL
        */
        NULL as ShortName,
        /*
        |       variable: FullName
        |       <data.tx_desc_long_1> & <data.tx_desc_long_2>
        */
        RTRIM(LTRIM(data.tx_desc_long_1 + ' ' + data.tx_desc_long_2)) as FullName,
        /*
        |       variable: StockType
        |       <data.id_typ_security>
        */
        data.id_typ_security as StockType,
        /*
        |       variable: ISIN
        |       <data.isin>
        */
        data.isin as ISIN,
```

FIG. 7A

| Stock Profile | |
|---|---|
| VARIABLES | |
| StockProfileIdType | NULL |
| StockProfileId | data.tx_desc_short |
| ShortName | NULL |
| FullName | data.tx_desc_long_1 & data.tx_desc_long_2 |
| StockType | data.id_typ_security |
| ISIN | data.isin |
| SEDOL | data.sedol |
| CUSIP | data.cusip |
| LocalReference | data.id_security "." |

FIG. 7B

| Stock Profile | |
|---|---|
| VARIABLES | |
| StockProfileIdType | NULL |
| StockProfileId | data.tx_desc_short |
| ShortName | NULL |
| FullName | cx_desc_long_2 |
| StockType | sis.tx_desc_short |
| ISIN | |
| SEDOL | data.sedol |
| CUSIP | data.cusip |
| LocalReference | data.id_security "." |
| Currency | data.cd_iso_ccy_position |
| Country | data.country |
| TradeVenue | data.id_stock_exchange |
| ShortSell | 1 |

FIG. 8

| id_monitor | workflowName | mappingName | runId | app... | custo... | custo... | isR... | scenarioCode | scenarioName | transformId | errorDesc |
|---|---|---|---|---|---|---|---|---|---|---|---|
| 46601 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4040984.0 | No Error |
| 46602 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4040989.0 | No Error |
| 46603 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4041051.0 | No Error |
| 46604 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4041140.0 | No Error |
| 46605 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4041161.0 | No Error |
| 46606 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4041213.0 | No Error |
| 46607 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4041216.0 | No Error |
| 46608 | w_ipb_stock_profile_t | m_ipb_stock_profile_t | 3215 | NAS | IPB | JIB | 0 | 15_Isin-2_Sedol-2_Cusip-2_Country-2_IssueDate-1_Clos... | Isin: no zero padding needed. Sedol: no z... | 4041377.0 | No Error |
| 46609 | w_ipb_stock_transact... | m_ipb_stock_transactio... | 3215 | NAS | IPB | JIB | 0 | 6_TransactionType-3_Income-1.1.1_0_0_0_0 | Transaction Type: same as cd_op. Incom... | 2788304 | No Error |
| 46610 | w_ipb_stock_transact... | m_ipb_stock_transactio... | 3215 | NAS | IPB | JIB | 0 | 6_TransactionType-3_Income-2.1.1_0_Tax-1.1_0_0_0 | Transaction Type: same as cd_op. Incom... | 2790351 | No Error |
| 46611 | w_ipb_stock_transact... | m_ipb_stock_transactio... | 3215 | NAS | IPB | JIB | 0 | 6_TransactionType-3_Income-2.1.1_0_Tax-1.1_0_0_0 | Transaction Type: same as cd_op. Incom... | 2790829 | No Error |
| 46612 | w_ipb_stock_transact... | m_ipb_stock_transactio... | 3215 | NAS | IPB | JIB | 0 | 1_TransactionType-3_TradeBasis-1_Cons-3.1_0_0_0_0 | Transaction Type: same as cd_mvt. Trad... | 9020389 | No Error |
| 46613 | w_ipb_stock_transact... | m_ipb_stock_transactio... | 3215 | NAS | IPB | JIB | 0 | 1_TransactionType-3_TradeBasis-1_Cons-3.1_0_0_0_0 | Transaction Type: same as cd_mvt. Trad... | 9020390 | No Error |
| 46614 | w_ipb_stock_transact... | m_ipb_stock_transactio... | 3215 | NAS | IPB | JIB | 0 | 1_TransactionType-3_TradeBasis-1_Cons-3.1_0_0_0_0 | Transaction Type: same as cd_mvt. Trad... | 9020391 | No Error |
| 46615 | w_ipb_stock_transact... | m_ipb_stock_transactio... | 3215 | NAS | IPB | JIB | 0 | 1_TransactionType-3_TradeBasis-1_Cons-2_1_0_0_0_0 | Transaction Type: same as cd_mvt. Trad... | 9020392 | No Error |
| 46616 | w_ipb_stock_transact... | m_ipb_stock_transactio... | 3215 | NAS | IPB | JIB | 0 | 1_TransactionType-3_TradeBasis-1_Cons-3.1_0_0_0_0 | Transaction Type: same as cd_mvt. Trad... | 9020393 | No Error |
| 46617 | w_ipb_stock_transact... | m_ipb_stock_transactio... | 3215 | NAS | IPB | JIB | 0 | 1_TransactionType-3_TradeBasis-1_Cons-2_1_0_0_0_0 | Transaction Type: same as cd_mvt. Trad... | 9020394 | No Error |
| 46618 | w_ipb_stock_transact... | m_ipb_stock_transactio... | 3215 | NAS | IPB | JIB | 0 | 5_TradeBasis-1_TradeQuantity-2_DeltaStock-2_DeltaPo... | Trade Basis: Quantity. Trade Quantity: ba... | 9018497 | No Error |
| 46619 | w_ipb_stock_transact... | m_ipb_stock_transactio... | 3215 | NAS | IPB | JIB | 0 | 5_TradeBasis-1_TradeQuantity-2_DeltaStock-2_DeltaPo... | Trade Basis: Quantity. Trade Quantity: ba... | 9018498 | Narrativ |

FIG. 11

SYSTEMS AND METHODS FOR TESTING OF DATA TRANSFORMATIONS

RELATED APPLICATIONS

This application claims priority to U.S. Application No. 62/339,206, filed May 20, 2016, entitled "Systems and Methods for Testing of Data Transformations," which is hereby incorporated by reference.

FIELD OF THE INVENTION

The present invention relates generally to data transformations, and more particularly to a system and method for the testing of data transformations using an automated testing process that dynamically retrieves input data.

BACKGROUND

Businesses frequently rely on third party software to process their data, often for critical applications. The third party software vendor typically has conducted extensive acceptance testing on the software prior to its release so that it performs according to specifications. However, there are circumstances in which the end user may have a need to verify the results produced by the software. For example, if the accuracy of the output is critical or if certain software modules have been coded according to the end user's specifications, the end user may need to verify the output. One example is an extract-transform-load (ETL) process that has been coded by a software vendor to process financial transaction data according to specifications provided by an end user. The end user provides the specifications for each data transformation and then uses the resulting transformations written and compiled by the software vendor. But the end user may not have an effective way to verify that the specifications have been accurately coded into the data transformations written and compiled by the software vendor. And if the specification is updated, the end user may not be able to effectively verify that the software has been updated accordingly. Although in most cases the software vendor will have coded the ETL process and its data transformations accurately, the end user may not be able to accept any risk of coding errors. Hence, there is a need for a system and method for an end user to verify the accuracy of an ETL process and related data transformations.

SUMMARY

According to one embodiment, the invention relates to a computer-implemented system and method for data transformation testing in an extract-transform-load (ETL) system. The method may be executed on a specially programmed computer system comprising one or more computer processors, electronic storage devices, and networks. The method may comprise the steps of: retrieving input data from a data source; using the input data as input to an actual data transformation to generate actual transformed data, wherein the actual data transformation is executed by the ETL system; using the input data as input to a test module to generate expected transformed data, wherein the input data is dynamically retrieved from the data source and the test module is part of the ETL system; automatically generating documentation for the test module based on comments within the test module; automatically comparing the actual transformed data to the expected transformed data; and generating a report based on the comparison. The method may also comprise monitoring and tracking a number of scenarios automatically, according to a predefined, desired schedule.

The invention also relates to computer-implemented system for data transformation testing in an ETL system, and to a computer readable medium containing program instructions for executing a method for data transformation testing in an ETL system.

The computer implemented system, method and medium described herein can provide a number of advantages. For example, the system can automatically test an ETL process that has been coded into software based on specifications used by a software vendor for the coding. The testing can be accomplished using the same program as the program executing the ETL process (e.g., by adding fields to it), rather than having a separate testing program. The process is dynamic in the sense that the input data need not be known beforehand but rather is retrieved dynamically from the same source. The various scenarios can be monitored, tracked and reported automatically, including according to a predefined, desired schedule. A report of actual vs. expected transformed data can be generated for each field. An API can be provided to automate the creation of test mappings, e.g. by reading the table where the transform data has been loaded and reading a View/Stored Procedure in order to obtain the correct field names, types, length, number, etc. Documentation can be automatically generated by correctly coding the View/Stored Procedure using comments in a predetermined format. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 4A depicts an example of code for a View/Stored Procedure according to an exemplary embodiment of the invention.

FIG. 4B shows an example of HTML documentation that can be automatically generated from the View/Stored Procedure code in FIG. 4A.

FIG. 5A shows an example of a View containing some test cases and scenarios according to an exemplary embodiment of the invention.

FIG. 5B shows HTML documentation that can be automatically generated from the View code in FIG. 5A.

FIG. 6 shows another example of a View used to test data transformations.

FIG. 7A shows an example of a View containing certain variables according to an exemplary embodiment of the invention.

FIG. 7B shows an example of HTML documentation that can be automatically generated using the View of FIG. 7A.

FIG. 8 shows an example of a hover function according to one embodiment of the invention.

FIG. 11 shows an example of results from the testing with no error shown in the transform monitor.

DETAILED DESCRIPTION

Figure 1:
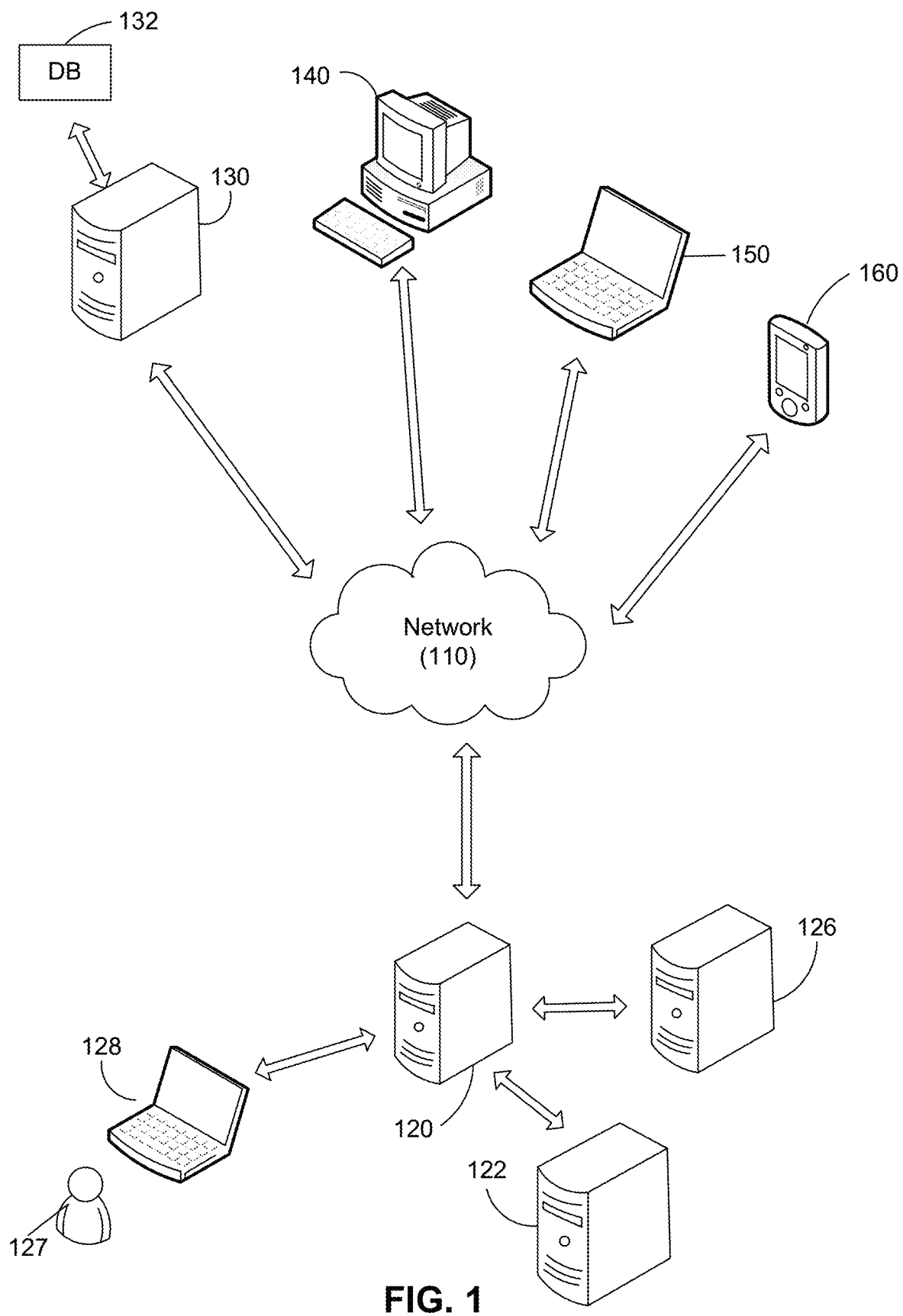
FIG. 1 is a diagram of a system for automatic data transformation testing according to an exemplary embodiment of the invention.

FIG. 1 is a diagram of a system for the testing of data transformations according to an exemplary embodiment of the invention. As shown in FIG. 1, the system may include a network and one or more computing devices, such as servers, desktop computers, laptop computers, tablet computers, and other mobile computing devices. The system may be operated by a business or other entity that receives data from different sources in a variety of formats. For simplicity, the examples set forth herein will be described in terms of a system operated by a financial institution. However, those skilled in the art will appreciate that other types of businesses and organizations can operate and maintain the system for the benefit of their respective customers, clients, or members.

As shown in FIG. 1, the system may be embodied primarily in a server 120 owned and/or operated by the financial institution. The server 120 may be operated by an analyst or operator 127 using a computing device such as a laptop computer 128. The server 120 may interface with a database 122, which may comprise a data warehouse system, for example. The server 120 may also interface with one or more other servers owned or operated by the financial institution, such as server 126 shown in FIG. 1 that may send certain types of data to the server 120.

The server 120 may also receive data from one or more third parties via a network 110. For example, FIG. 1 illustrates a number of other computing devices such as servers, desktop computers, laptop computers, and mobile computers that may transmit data in various formats to the server 120 via the network 110 according to one embodiment of the invention. For example, various data sets may be transmitted automatically or manually by one or more third party servers 130 and associated databases 132, desktop computers 140, laptop computers 150, and/or tablet computers or mobile computing devices 160.

The network 110 shown in FIG. 1 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The foregoing description is merely one example of a configuration for such systems and functions and is not intended to be limiting.

The data transmitted to the server 120 may exist in various formats, such as flat files, tables, relational databases, or other formats. The data files may be sent to the server 120 by various processes, such as transmission to a designated email address, FTP site, or other transmission process. The files may arrive from different sources and have dissimilar data and layouts.

According to one example, the server 120 stores and executes an extract-transform-load (ETL) software application that processes incoming data by use of data transformations. A data transformation generally refers to a process executed by a software application or module that receives data in a known format and applies certain operations to the data to produce data in a different format and/or modified data. One example of a software application that provides numerous types of data transformations is Informatica. For simplicity, the following discussion will describe an example using Informatica. However, those skilled in the art will appreciate that different embodiments of the invention may be applied to other software applications or systems.

Figure 2:
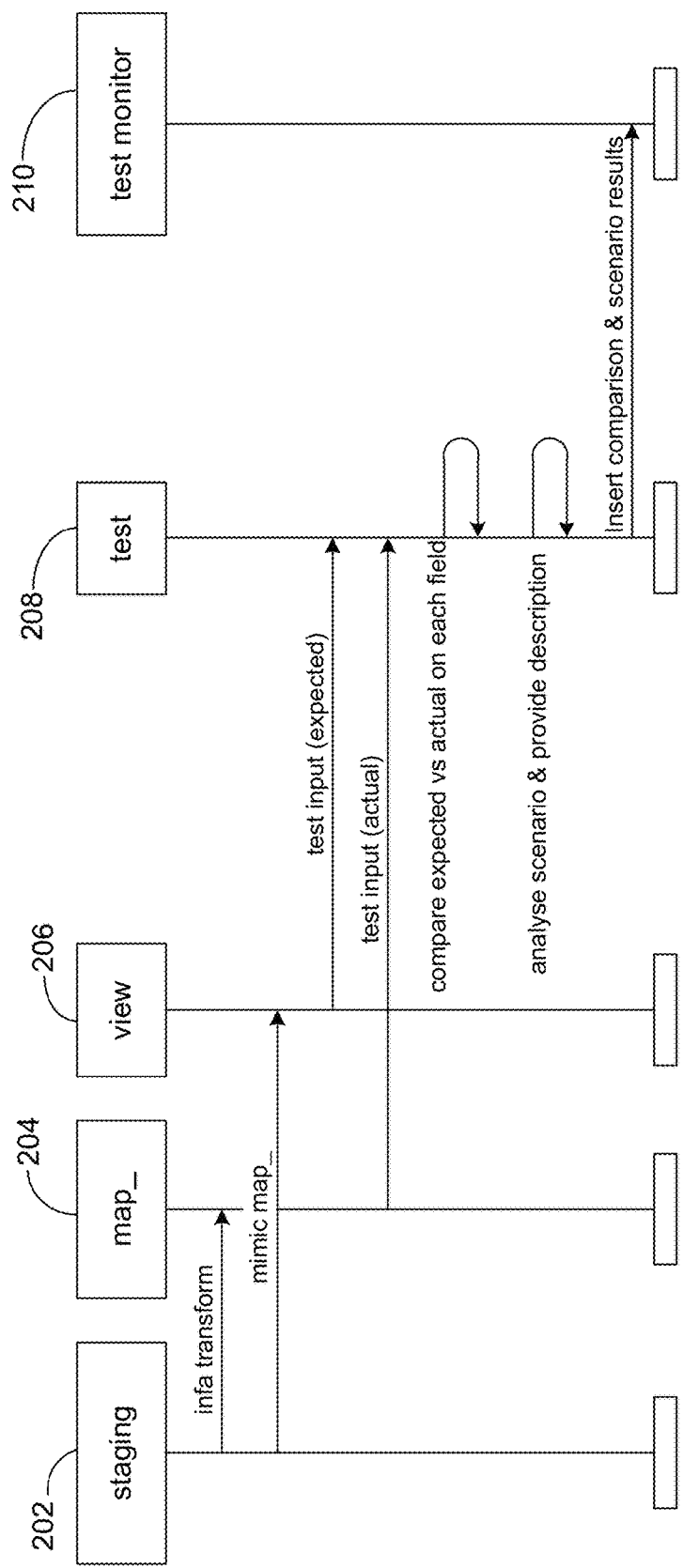
FIG. 2 illustrates an example of a method for automatically testing and monitoring a data transformation according to an exemplary embodiment of the invention.

Referring now to FIG. 2, an example of an ETL testing system and method will now be described according to an exemplary embodiment of the invention. As shown in FIG. 2, in the staging step 202, the incoming data is retrieved from an upstream processes and stored. The incoming data is used as input both for an Informatica transform (infa transform) as well as for a mimic map. The result of the Informatica transform is stored by a map module 204. The mimic map may comprise a software routine that pulls the same data as the data used as input to the Informatica transform. The input data may be viewed by the user through a "View/Stored Procedure" software module 206 that displays the input data.

The View/Stored Procedure 206 can be programmed to dynamically retrieve the input data from the same source 202 as the Informatica transform and to perform the same operation on the input data as the operation performed by the Informatica transform. The system executes the Informatica transform on the input data and produces an "actual" result, as shown in FIG. 2. The system also uses a View/Stored Procedure 206 to execute the same logic on the input data to produce an "expected" result. This step includes the logic that is expected to be coded into the Informatica transform, based on the specifications for the Informatica transform.

Once the actual test results and the expected test results have been generated, they can be compared with respect to each data field by a test module 208. The system can be programmed to analyze each scenario and provide a description. As used herein, a "scenario" generally refers to a condition on data after which the outcome varies based on the input. For example, the user may want to track data changes based on conditions (scenarios), such as outputting 'Credit' if the amount is positive, or 'Debit' if it's negative. According to one embodiment, by adding two fields to the Informatica transform, it is possible to monitor what scenarios are being encountered. One particular example is described as follows. "ScenarioCode" is one field that represents a concatenation in a particular format of all the scenarios identified, and "TransformId" is a second field that provides a way to uniquely identify the data so that the row coming from the View/Stored Procedure can be matched to the row transformed by Informatica. The scenario code is formatted so that an unlimited and unknown number of scenarios can be identified by the transform. According to one example, the format is: <TransformCode>_[<scenarioCode>-[<scenarioCase>.*]* For example: 3_CashTransaction-1_StockProfileA-1/3.4 means the Transform 3 has two scenarios; CashTransaction and StockProfileA. CashTransaction case was 1 and StockProfileA cases were 1/3 and 4. For example, CashTransaction 1='Credit' and CashTransaction 2='Debit'. A set of calculations can be responsible for determining if the outcome is 'Credit' or 'Debit.' This is then linked to a table which can match the data above to a human readable description of each case. For example, instead of just showing '1' which is just a code, it could provide a scenario description such as 'Cash transaction of type Credit.' This permits in the long run to monitor which scenarios are used, at what frequency, what are their descriptions, etc. The Informatica test mappings can be plugged into a scheduler to automate the entire process.

Referring again to FIG. 2, the comparison and scenario results can be transmitted to a test monitor module 210, which allows the end user to monitor the testing by displaying the test results for each scenario. The comparison function compares the expected test results with the actual test results to determine and indicate if they are the same.

According to an exemplary embodiment of the invention, the same system (i.e., Informatica in this example) is used for execution and testing, rather than creating a separate system for testing. A View/Stored Procedure 206 is used for fetching the input data and generating the expected data. The system builds the documentation from the View/Stored Procedure and includes scenario monitoring. Also, the testing is dynamic testing, as fields in the transform are tested without knowing the input data elements or caring about the data source.

The View/Stored Procedure software code is preferably commented in a manner that allows the software documentation to be generated automatically. For example, the software code may include comments delineated with the characters /* and */. According to one embodiment of the invention, a documentation generator such as NaturalDocs is used to scan the software code and automatically generate documentation for the code in HTML format. NaturalDocs is an open source documentation generator for a number of programming languages. Based on the Informatica mapping that verifies the data from the View/Stored Procedure is the same as for the transformed data, the View/Stored Procedure documentation becomes the Informatica Transform documentation and is tied to the transform. Given the view produces the correct expected output and the Informatica mapping that compares the expected vs actual data proves to be working correctly (identifying no error in the comparison, running smoothly, fetching the correct number of rows, etc.), then the documentation generated from the view matches the specification for the Informatica transformation mapping.

According to another embodiment of the invention, an application programming interface (API) can be used to further automate the creation of Informatica test mappings. In particular, the Informatica test mapping can be automatically created through the Informatica Java API according to one example. This embodiment entails reading the table where the transform data has been loaded and reading the View/Stored Procedure in order to obtain the correct field names, types, length, number, etc. The remaining functions (e.g., comparison between View/Stored Procedure and transformed data, parsing the ScenarioCode, inserting the data in the monitoring table) are the same regardless of the transform tested. If the API is used to automatically generate the Informatica test mapping, any change in the data sources (View/Stored Procedure or transformed data) wouldn't need to be replicated across the mapping manually. Creating such testing mapping can also be done through the API.

Figure 3:
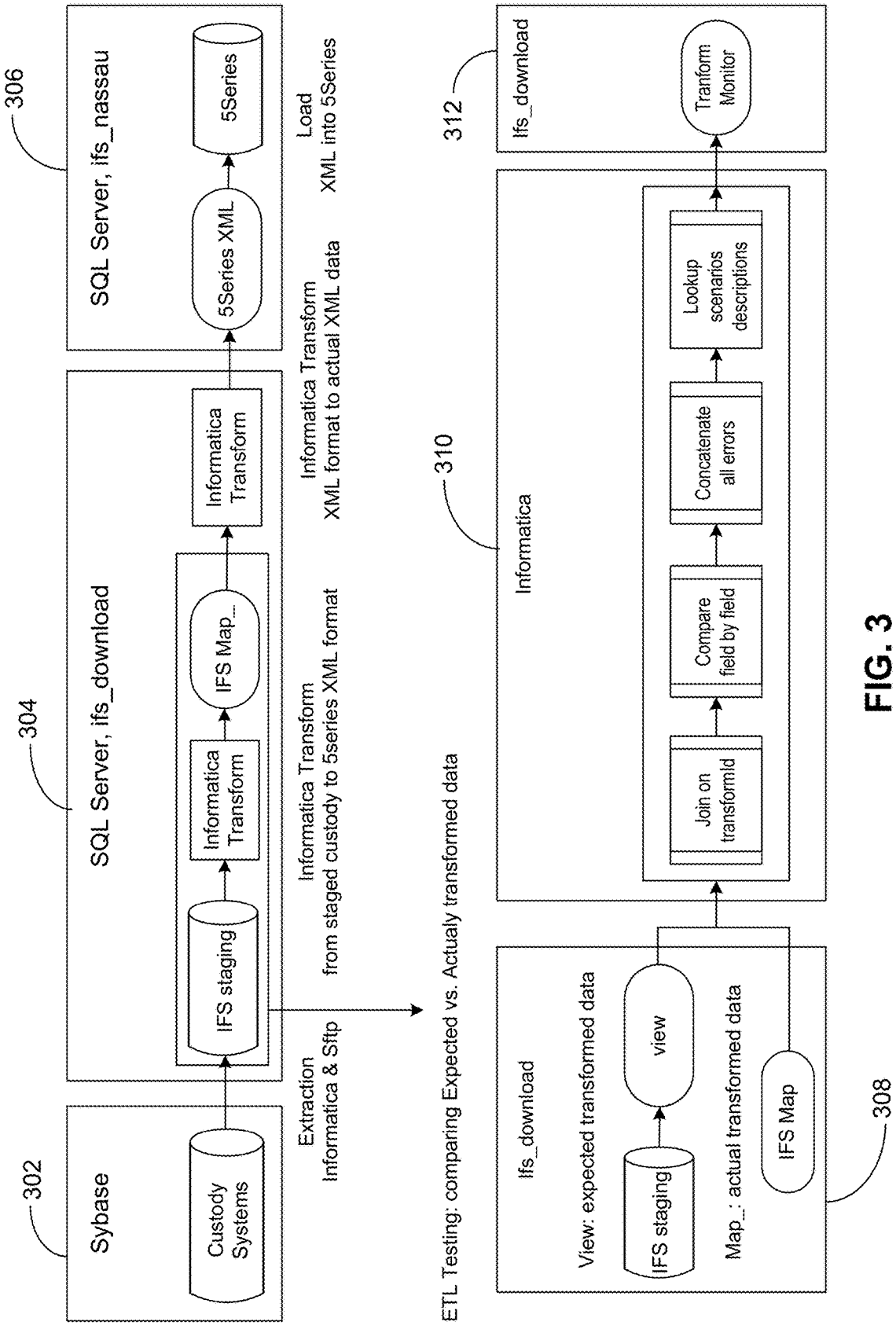
FIG. 3 illustrates an example of a method for automatically testing and monitoring a data transformation according to an exemplary embodiment of the invention.

FIG. 3 illustrates additional features of the testing system and method according to an exemplary embodiment of the invention. FIG. 3 shows an example of an ETL process from the custody systems (on a Sybase database in this example) to 5Series 306. The custody systems are the upstream systems where the client data that needs to be processed is stored, i.e., the data source. In the ETL testing, the expected transformed data is generated with the View/Stored Procedure in box 308, and the actual transformed data is generated with the Informatica transform (IFS Map) in box 304. Both the View/Stored Procedure and the Informatica transform pull data from the same source (IFS Staging) in box 304. The expected and actual transformed data are then compared and displayed with the transform monitor 312. The variable "transformId" is included to serve as a reference so that the results of each data transformation can be compared field-by-field. The results are compared automatically and any errors are identified and displayed by the transform monitor, according to one embodiment of the invention.

An Informatica transform is responsible for fetching data from the staged custody data tables and inserting them in the "IFS Map_" staging area. The "IFS Map_" staging area is formatted as per 5Series documentation according to one embodiment of the invention. 5Series is an example of an accounting program to which the data can be loaded, once transformed into XML. This XML is formatted as per the 5Series documentation. Then the data is converted into XML as per the 5Series documentation through the 5Series XSD. Once the XML is generated, a 5Series tool is called that loads the XML into 5Series according to this example.

The top half of FIG. 3 illustrates the developed process and flow of the data corresponding to business requirements. The bottom half of FIG. 3 shows the testing process. "IFS Map_" is the output of the business process that is compared to "IFS Staging" and "View" (the views). The system then conducts the comparison.

The comparison is illustrated by box 310 in the bottom half of FIG. 3. "Join on transformId" refers to the process for identifying and associating actually transformed data with test data. Then the data are compared "field by field" because each has the same number of fields (e.g., Debit, Credit, Amount, etc.). All errors found during the comparison are aggregated together in order to be stored in the database as an error message. All scenarios (as explained above) are looked up in the database and their descriptions are pulled. The description is a plain English business description that explains the transformation that happens on the data. The system shown in FIG. 3 can thus compare the actual output to the test views output; compare the output field by field and provide a list of errors found in the comparison; and look up the scenarios to translate to plain English the business cases descriptions.

FIG. 4A illustrates an example of the software code to create a View. The particular example in FIG. 4A is code to create a View of the IPB Stock Profile, which includes a number of fields. An IPB Stock Profile is a profile of a security associated to a transaction, i.e., an example of the type of transformation that is processed by the system. The View fetches data from the table stg_ipb_security aliased as sis. This table contains all securities from the upstream systems according to one embodiment of the invention. This View will output the data the Informatica transform is expected to produce. The software code includes comments, delineated with the characters /* and */. The comments can be used to create documentation for the code automatically. According to one embodiment, NaturalDocs is used to scan the code and automatically generate documentation for the code in HTML format. FIG. 4B shows an example of the HTML which can be generated by NaturalDocs automatically using the comments in the View in FIG. 4A. The HTML document shows in a user friendly manner the code comments from the View. Hence, it shows what the View really does (what tables are read, what fields are used, etc.). Hence, the SQL code in FIG. 4A that tests Informatica mappings is also used to produce the documentation automatically according to a preferred embodiment of the invention.

Figure 5C:
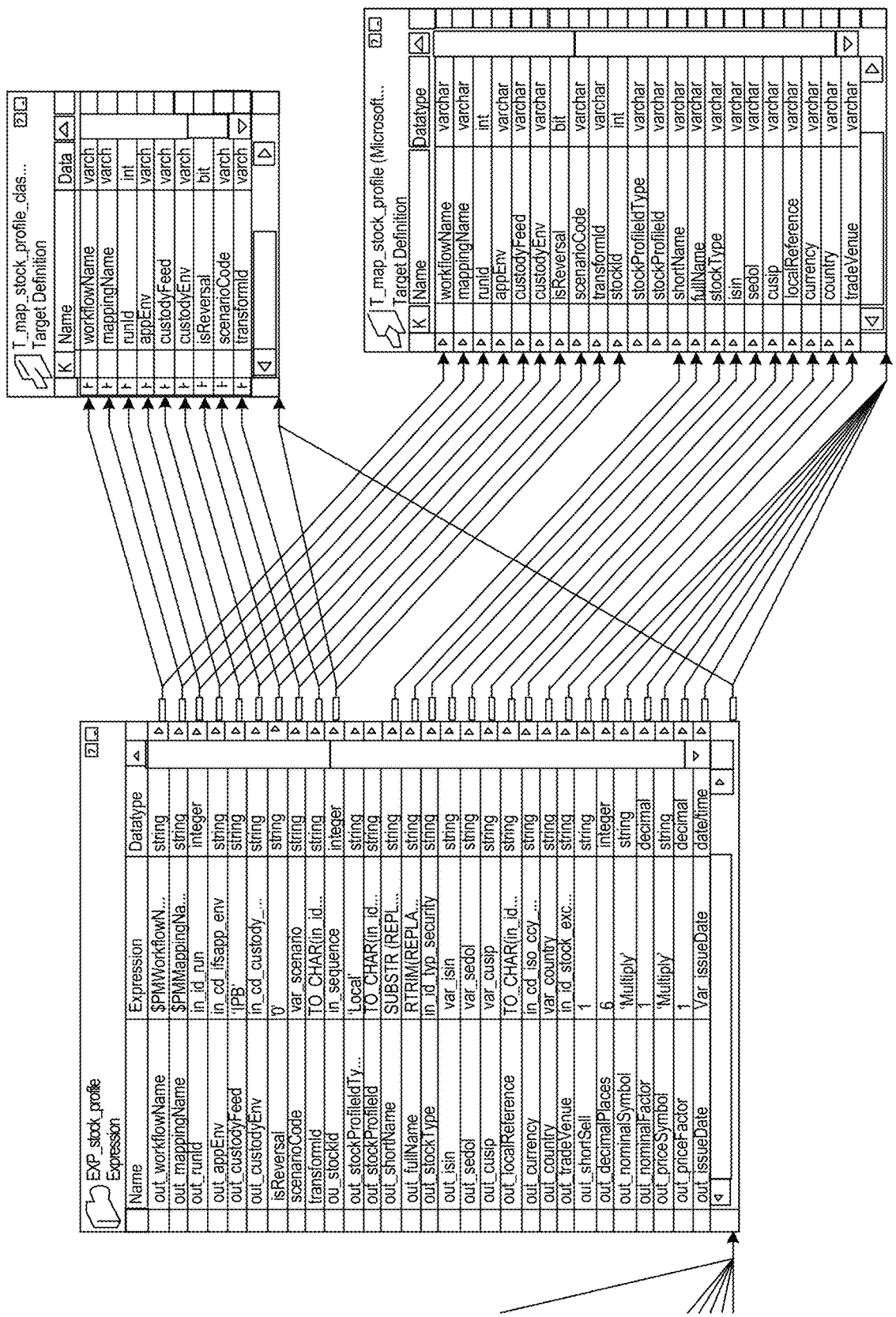
FIG. 5C shows an example of an Informatica transform, according to an exemplary embodiment of the invention.

FIG. 5A shows an example of a View of some test cases and their scenarios according to an exemplary embodiment of the invention. In the ISIN example, the system ensures the length is 12 digits. If not, the system zero pads from the left (e.g. 123456789 is changed to 000123456789). The system gives this scenario the value 1 if we have to zero pad the data, 2 if not. FIG. 5B shows the corresponding HTML that can be generated automatically using NaturalDocs or similar document generation software, based on the comments in FIG. 5A. FIG. 5C depicts an example of the actual Informatica transform. The two targets (on the right) are the Informatica output. They are also one of the comparison inputs ("actual transformed data"). According to this example, a stock profile has a stock profile classification, hence the 2 targets. EXP_stock_profile is an Informatica transformation object that changes values of fields and sends them to those two target tables. FIG. 5C shows that the same names are used for the Informatica transform as for the View and test module.

FIG. 6 shows an example of the code used to create the View. Based on the description above, it will fetch these fields. These in particular are here to describe the context of the data (environment, Informatica mapping responsible for the transformation, concatenation of all scenarios, id, etc.). FIG. 6 provides an example of an advantageous feature of the system, i.e., the concatenation of scenarios, because that enables a user to keep track of all transformations that happen to the data. In FIG. 6, all fields from the line with '15_' to the line "as scenario" are merged together, or concatenated. These fields are data.isin_Scenario, data.sedol_Scenario, etc., as shown in FIG. 6. All scenarios are listed which qualifies the data transformation that happened. FIG. 7A shows a transformId and scenarios and below the fields that will be compared in Informatica. They represent what is expected after an Informatica transform. FIG. 7B shows the HTML which can be automatically generated with NaturalDocs or similar documentation generation system based on the comments in FIG. 7A. It is part of the functionality described above, as it is used to compare records between the output of Informatica and the output of the test view/stored procedure. The user uses the HTML documentation to see what transformation happens, and if they match their business cases.

FIG. 8 illustrates a "hover" function in HTML. The hover function shows additional data when the user causes the pointer to hover over the link. Dynamic HTML is automatically generated. The hover feature is part of the framework of NaturalDocs.

Figure 9:
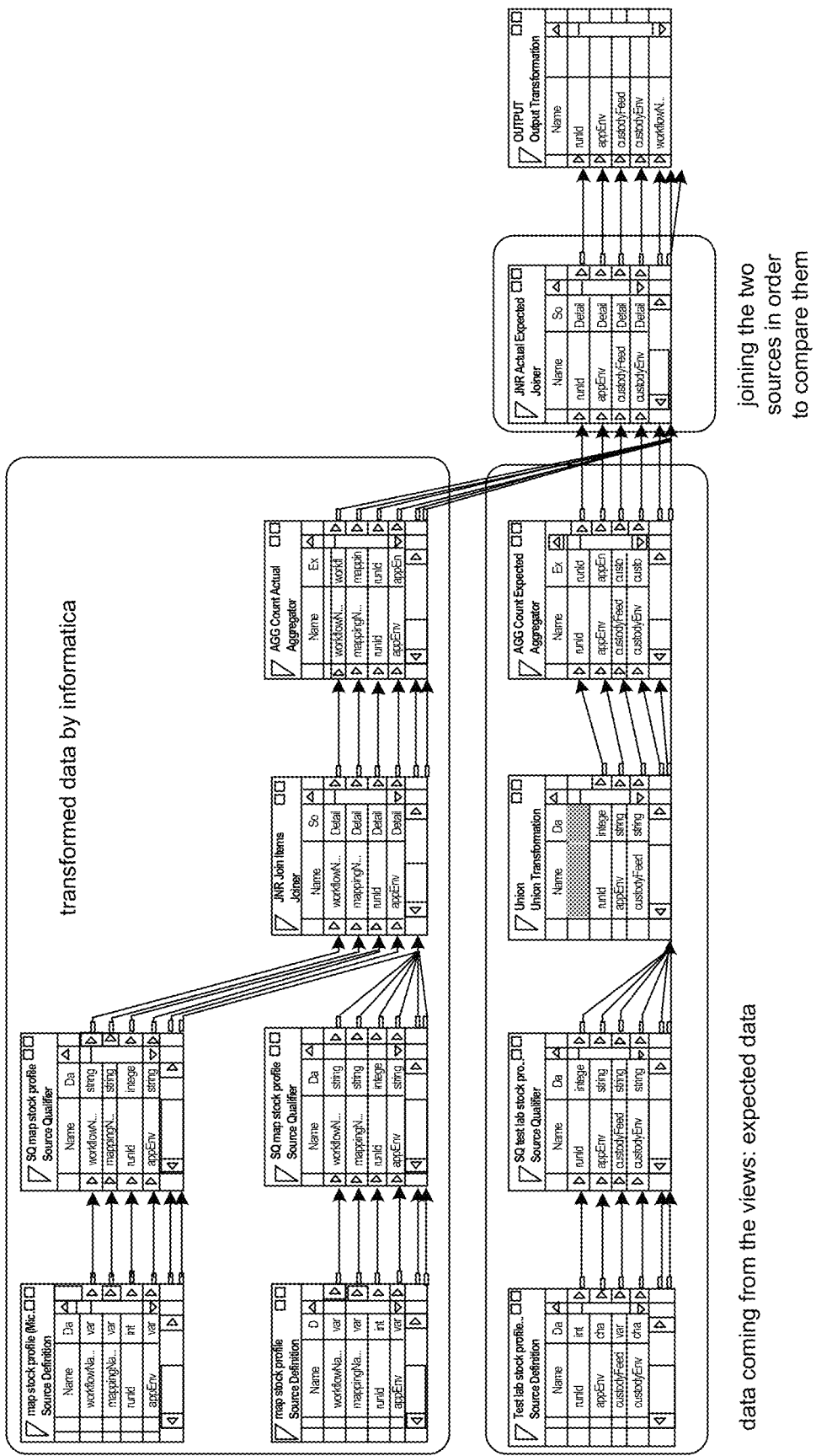
FIG. 9 shows an example of an Informatica mapping that includes fetching data, a view for generating expected transformed data, and a map for generating actual transformed data according to an exemplary embodiment of the invention.

FIG. 9 shows an example of an Informatica mapping. Data is fetched, the View shows the expected transformed data, and the map shows the actual transformed data. The Informatica objects in FIG. 9 are used in order to pull data from a data source. According to one aspect, the "transformed data by Informatica" is segregated from the "expected data." The system joins (or associates) this data with a Joiner in order to be able to compare expected versus actual data.

Figure 10:
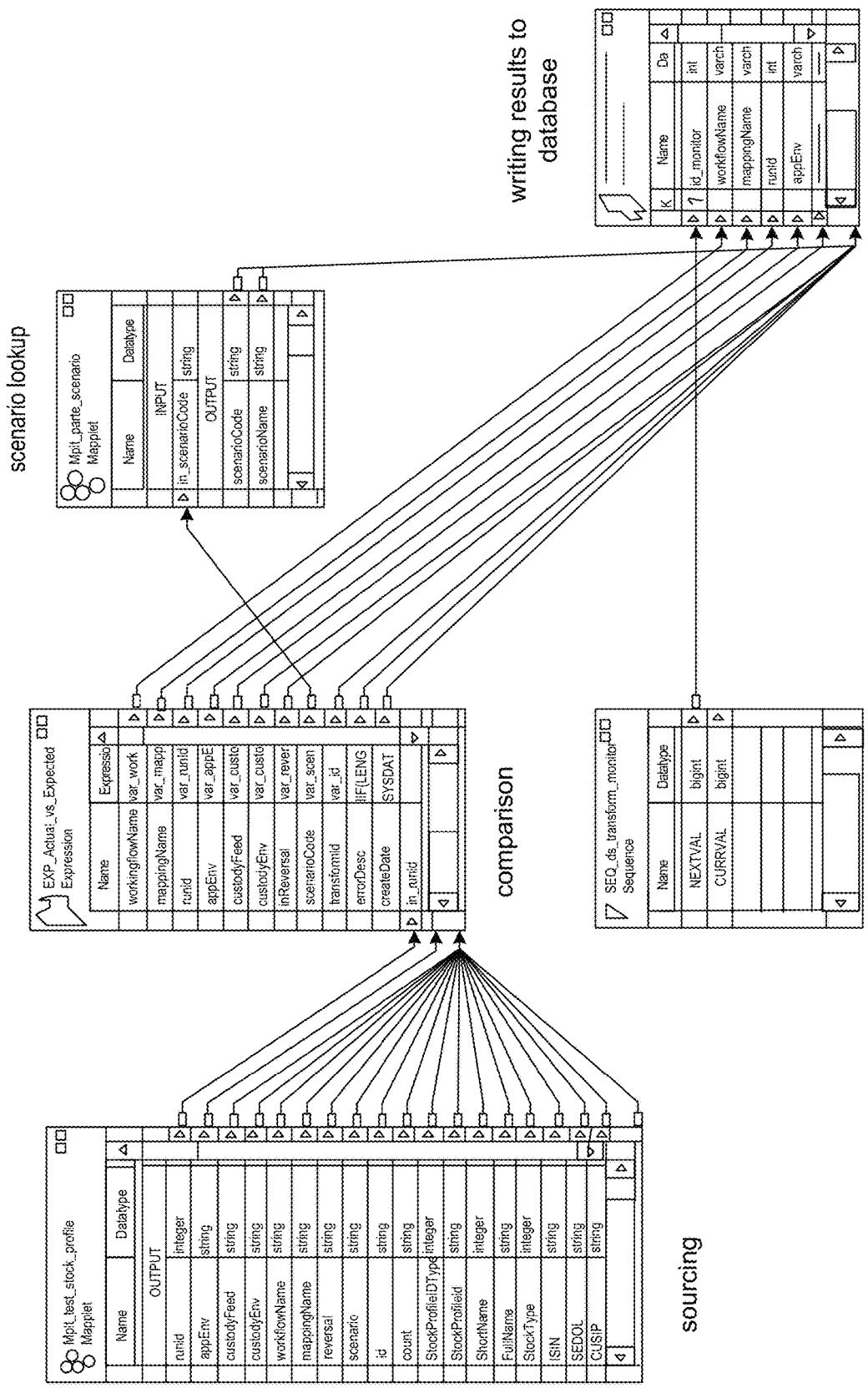
FIG. 10 shows an example of an Informatica mapping including a comparison, lookup, and writing to a database table according to an exemplary embodiment of the invention.

FIG. 10 shows an example of an Informatica mapping which produces a comparison and lookup, and then writing to a database table. The sourcing table in FIG. 10 serves to source the data as described above with respect to FIG. 9. The comparison table in FIG. 10 is the comparison done field by field which outputs any error found. The scenario lookup table in FIG. 10 is the Java code that does the lookup of the scenarios explained above. The target is where the errors found in the comparison and the scenarios descriptions are written.

FIG. 11 shows an example of results with "No Error" in the table transform monitor. In this example, the testing has confirmed that the actual results of the Informatica transform are the same as the expected results from the View/Stored Procedure, which is intended to apply the same logic as the Informatica transform. This is the result of the comparison.

The computer implemented system and method described herein can provide a number of advantages. For example, the system can automatically test an ETL process that has been coded into software based on specifications used by a software vendor for the coding. The testing can be accomplished using the same program as the program executing the ETL process (e.g., by adding fields to it), rather than having a separate testing program. The process is dynamic in the sense that the input data need not be known beforehand but rather is retrieved dynamically from the same source. The various scenarios can be monitored, tracked and reported automatically, including according to a predefined, desired schedule. A report of actual vs. expected transformed data can be generated for each field. An API can be provided to automate the creation of Informatica test mappings, e.g. by reading the table where the transform data has been loaded and reading the View/Stored Procedure in order to obtain the correct field names, types, length, number, etc. Documentation can be automatically generated by correctly coding the View/Stored Procedure using comments in a predetermined format.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network 110 in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network 110 may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of servers 120, 122, 126, 130, personal computing devices 128, 140, 150, and mobile device 160 are shown in FIG. 1, exemplary embodiments of the invention may utilize other types of communication devices whereby a user may interact with a network that transmits and delivers data and information used by the various systems and methods described herein. The servers, personal computing devices, and mobile devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The personal computing devices 128, 140, 150, and mobile device 160 may include various connections such as a cell phone connection, WiFi connection, Bluetooth connection, satellite network connection, and/or near field communication (NFC) connection, for example.

As described above, FIG. 1 includes a number of servers 120, 122, 126, 130 and user communication devices 128, 140, 150, 160, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the mobile device 160 or personal computing devices 128, 140, 150. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented method for data transformation testing in an extract-transform-load (ETL) system, the method comprising:
    processing, using one or more ETL transforms, one or more input data sets retrieved from one or more data sources to generate actual transformed data from the one or more data sets, wherein one or more additional data fields are added to the one or more input data sets to identify one or more transformation scenarios;
    generating a scenario code by concatenating, using a predefined format, the one or more identified transformation scenarios;
    processing, by a test module having a software code implementing a same logic as that of the one or more ETL transforms, the one or more input data sets to generate expected transformed data from the one or more data sets, wherein the one or more input data sets are dynamically retrieved, by the test module, from the one or more data sources and wherein the test module is part of the ETL system;
    monitoring, based on the generated scenario code, the one or more identified transformation scenarios according to a predefined schedule;
    providing an error indication for each of the plurality data fields in the actual transformed data that is not the same as the corresponding data field in the expected transformed data;
    upon determining that no error indications are associated with the actual transformed data, generating documentation for the one or more ETL transforms based on one or more comments in the software code of the test module.

2. The method of claim 1, wherein the step of generating documentation for the one or more ETL transforms comprises using a documentation generator to scan the software code and automatically generate documentation for the software code.

3. The method of claim 2, wherein the documentation generated for the software code is in HTML format.

4. The method of claim 1, further comprising the step of displaying on a monitor at least one of the one or more input data sets, the actual transformed data, the expected transformed data, and one or more error indications associated with the actual transformed data.

5. The method of claim 1, further comprising generating a list of error indications provided for the actual transformed data.

6. The method of claim 1, wherein the test module is activated automatically in response to the processing of the one or more input data sets using the one or more ETL transforms.

7. The method of claim 1, further comprising generating, using a lookup table, a human readable description for each of the one or more scenarios in the scenario code.

8. A computer-implemented extract-transform-load (ETL) system for data transformation testing, the system comprising:
    a memory to store data from at least one data source; and
    a computer processor that is programmed to:
    process, using one or more ETL transforms, one or more input data sets, retrieved from one or more data sources, to generate actual transformed data, wherein one or more additional data fields are added, by the computer processor, to the one or more input data sets to identify one or more transformation scenarios;
    generate a scenario code by concatenating, using a predefined format, the one or more identified transformation scenarios;
    process, by a test module having a software code that implements a same logic as that of the one or more ETL transforms, the one or more input data sets to generate expected transformed data from the one or more input data sets, wherein the one or more input data sets are dynamically retrieved, by the test module, from the one or more data sources, and wherein the test module is part of the ETL system;
    monitor, based on the generated scenario code, the one or more identified transformation scenarios according to a predefined schedule;
    provide an error indication for each of the plurality data fields in the actual transformed data that is not the same as the corresponding data field in the expected transformed data; and upon determining that no error indications are associated with the actual transformed data, generate documentation for the one or more ETL transforms based on one or more comments in the software code of the test module.

9. The system of claim 8, wherein the system comprises a documentation generator that scans the software code and automatically generates documentation for the software code.

10. The system of claim 9, wherein the documentation generated for the software code is in HTML format.

11. The system of claim 8, further comprising a computer monitor, wherein the computer processor is programmed to display on a computer monitor at least one of the one or more input data sets, the actual transformed data, the expected transformed data, and one or more error indications associated with the actual transformed data.

12. The system of claim 8, wherein the computer processor is programmed to generate a list of error indications provided for the actual transformed data.

13. The system of claim 8, wherein the test module is activated automatically in response to the processing of the one or more input data sets using the one or more ETL transforms.

14. The system of claim 8, wherein the computer processor is further programmed to generate a human readable description, using a lookup table, for each of the one or more transformation scenarios in the scenario code.

* * * * *